(12) United States Patent
Yetzbacher et al.

(10) Patent No.: US 10,139,531 B2
(45) Date of Patent: Nov. 27, 2018

(54) MULTIPLE BAND SHORT WAVE INFRARED MOSAIC ARRAY FILTER

(71) Applicants: Michael K. Yetzbacher, Burke, VA (US); Michael Wilson, Alexandria, VA (US)

(72) Inventors: Michael K. Yetzbacher, Burke, VA (US); Michael Wilson, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 206 days.

(21) Appl. No.: 14/851,042

(22) Filed: Sep. 11, 2015

(65) Prior Publication Data
US 2016/0077253 A1    Mar. 17, 2016

Related U.S. Application Data

(60) Provisional application No. 62/050,117, filed on Sep. 13, 2014.

(51) Int. Cl.
*G01J 1/04* (2006.01)
*G02B 5/20* (2006.01)
*G01J 3/28* (2006.01)

(52) U.S. Cl.
CPC ............ *G02B 5/201* (2013.01); *G01J 3/2823* (2013.01); *G02B 5/208* (2013.01); *G01J 2003/2826* (2013.01)

(58) Field of Classification Search
CPC ...... G01J 1/0437; G01J 1/0488; G01J 3/2823; G01J 2003/2826
See application file for complete search history.

(56) References Cited

U.S. PATENT DOCUMENTS

| | | | | |
|---|---|---|---|---|
| 3,971,065 A | * | 7/1976 | Bayer | ............... H01L 27/14621 313/371 |
| 5,504,717 A | * | 4/1996 | Sharkey | ................... G01S 3/801 367/124 |

(Continued)

OTHER PUBLICATIONS

Hirakawa, K. et al., "Spatio-Spectral Color Filter Array Design for Optimal Image Recovery," Instutute of Electrical and Electronics Engineers (IEEE) Transactions on Image Processing, vol. 17, No. 10, pp. 1876-1890 (2008).

(Continued)

*Primary Examiner* — David Porta
*Assistant Examiner* — Djura Malevic
(74) *Attorney, Agent, or Firm* — US Naval Researh Laboratory; Suresh Koshy

(57) ABSTRACT

A camera system includes a mosaic optical color filter array, which includes a plurality of repeating unit cells that enforce spectral consistency and spatial uniformity. Each repeating unit cell of the plurality of repeating unit cells satisfies a minimum focal-plane array perimeter criterion and a minimum perimeter to area ratio criterion. The spatial arrangement of bands within the repeating unit cell minimizes inter-band correlation between nearest neighbors. The camera system further includes as short-wave infrared detector optically coupled to the mosaic optical color filter array. Optionally, the mosaic optical color filter array includes at least five spectral bands. The plurality of repeating unit cells includes the at least five spectral bands.

10 Claims, 11 Drawing Sheets

(56) References Cited

U.S. PATENT DOCUMENTS

| | | | |
|---|---|---|---|
| 5,600,732 A * | 2/1997 | Ott | G06K 9/036 |
| | | | 382/112 |
| 6,638,668 B2 | 10/2003 | Buchsbaum et al. | |
| 7,648,808 B2 | 1/2010 | Buchsbaum et al. | |
| 2005/0088550 A1* | 4/2005 | Mitsunaga | H04N 9/045 |
| | | | 348/272 |
| 2007/0024931 A1 | 2/2007 | Compton et al. | |
| 2007/0145273 A1* | 6/2007 | Chang | H04N 5/33 |
| | | | 250/338.1 |
| 2009/0136154 A1* | 5/2009 | Bocko | G06F 17/147 |
| | | | 382/280 |
| 2012/0056160 A1* | 3/2012 | Tian | H01L 27/14603 |
| | | | 257/21 |

OTHER PUBLICATIONS

Miao, L., et. al., "Binary tree-based generic demosaicking algorithm for multispectral filter arrays," IEEE Transactions on Image Processing, vol. 15, No. 11, p. 3550 (2006).

Shrestha, R. et. al., "Spatial arrangement of color filter array for multispectral image acquisition," Proceedinas of SPIE-IS&T Electronic Imaging v.7875 p. 787503 (2011).

\* cited by examiner

MULTIPLE BAND SHORT WAVE INFRARED MOSAIC ARRAY FILTER

CROSS-REFERENCE TO RELATED APPLICATIONS

This application claims priority to U.S. Provisional Patent Application Ser. No. 62/050,117, entitled "MULTI-BAND SHORT-WAVE INFRARED MOSAIC ARRAY FILTER," to Yetzbacher al., which was Filed on 13 Sep. 2014 and is incorporated herein by reference.

FIELD OF THE INVENTION

The present invention relates to multispectral image collection. More particularly, the present invention involves multispectral image collection in short-wave infrared spectral range.

BACKGROUND OF THE INVENTION

Multi-spectral and hyper-spectral imagery has been used to detect and identify vegetation, minerals, chemicals, and types and health of biological tissues. To date, the majority of hyperspectral and multispectral imaging systems have employed line-scanning push-broom instrument designs, using an Offner imaging spectrometer design. Some designs use a specially modified stabilized gimbal design to allow a line scanning spectrometer to collect hyperspectral data at highly oblique angles, such as the MX-20SW hyperspectral imager developed by the Naval Research Laboratory and built by Brandywine Photonics LLC). However, the line-scanning nature of these instruments limits the revisit rate over a designated area due to the time required to build the full hyperspectral data cube. Desires for persistent hyperspectral data and full motion video hyperspectral data have led to alternative designs, such as PHIRST Light, that use a liquid crystal tunable filter to persistently image an entire scene at near video rates while scanning the liquid crystal filter through the desired spectra). The disadvantage of this approach is that the full spectra from the scene are not collected simultaneously in time. The computed-tomography imaging spectrometer ("CTIS") allows for single shot collection of both spatial and spectral information at the expense of optical and computational complexity, and focal-plane array real-estate. A more recent approach has been demonstrated using plenoptic principles with relatively simpler optical elements. This specialized plenoptic camera utilized spectral elements on the objective lens and a lenslet array on the detector to trade spatial resolution for spectral resolution. However, the device requires a lens specifically matched to the lenslet array and focal-plane array design, and additional computation is required to account for lens-specific aberrations. Lastly, conventional color filter array ("CFA") technology places a repeating, or mosaic, pattern of filter elements above blocks of detector pixels on a large focal-plane array. Image processing is then performed on this mosaic pattern image to generate a complete hyperspectral data set for multiple locations within the imaged area. The CFA design removes the restrictive lens tailoring that is found in all line scanning and lenslet systems. This allows for greater ability to change lenses in the field and to quickly adapt cameras to a variety of imaging needs.

Color filter arrays are commonly used to sense color information using two-dimensional and linear photosensitive arrays. See, e.g., U.S. Pat. No. 3,971,065 to Bayer, which is incorporate herein by reference. Most commercial color visible camera systems use a Bayer color filter array consisting of a repeating 2×2 pattern of individual red, blue, and green filtered pixels, although many variants of the 3-color visible color filter array are known. See, e.g., U.S. Pat. Application Publication No. 20070024931 to Compton et al. and U.S. Patent Application Publication No. 20070145273 to Chang, which are both incorporate herein by reference. Visible-band color filter arrays typically use absorptive materials for their filter elements, although there are examples using dielectric thin-film filter elements. See, e.g., U.S. Pat. No. 7,648,808 to Buchsbaum.

Related art exists to extend color filter arrays to more bands than found in traditional 3-color Bayer filter arrays. For example, based on recovering high-spatial frequency luminance and low spatial-frequency chrominance, Hirakawa and Wolfe suggested arbitrary numbers of spectral bands could be achieved by mosaic array filters that were linear combinations of the Bayer pattern. See, e.g., Hirakawa, K. et al., "Spatio-Spectral Color Filter Array Design for Optimal Image Recovery," Institute of Electrical and Electronics Engineers (IEEE) Transactions on Image Processing, Vol. 17, No. 10, pp. 1876-1890 (2008), incorporated herein by reference. However, in the short-wave infrared wavelength range, correlations between color channels are not guaranteed. Further, chrominance and luminance are not well defined in the SWIR, being derived from human vision characteristics. Miao et. al. have given an alternative way to design multi-spectral CFAs that is independent of human vision; they base CFA design on the probability of appearance of a band. See e.g., Miao, L., et. al., "Binary tree-based generic demosaicking algorithm for multispectral filter arrays," IEEE Transactions on Image Processing, Vol. 15, No. 11, p. 3550 (2006), incorporated herein by reference. Miao et al.'s design scheme is, however, prohibited in the SWIR, where a much smaller library of images is available and band probabilities cannot always be estimated. Additionally, the patterns generated by Miao et al.'s design algorithm lack spectral consistency and spatial uniformity. By contrast, Shrestha et. al. Shrestha and colleagues have produced a multi-spectral color filter array design algorithm that enforces spectral consistency and spatial uniformity. See, e.g., Shrestha, R. et. al., "Spatial arrangement of color filter array for multispectral image acquisition," Proceedings of SPIE-IS&T Electronic Imaging v.7875 p.787503 (2011), incorporated herein by reference. However, Shrestha et al.'s algorithm uses foreknowledge of band probabilities in the design. Disadvantageously, Shrestha's algorithm does not enforce a constraint for maximization of spectral quality, while minimizing the distance on the focal plane required to collect independent complete spectral measurements. This leads to Shrestha et al.'s mosaic unit cells being larger than needed to accommodate the close-packed number of bands resulting in convex areas of the mosaic array in which certain color information is absent. Both of these effects lead to degradation in average spectral quality for objects whose images are of sizes comparable to the minimum perimeter unit cell. The discussions in the above journal articles are limited to visible-band detectors.

BRIEF SUMMARY OF THE INVENTION

Applicants determined a need for multispectral imaging collection systems which are free of degradation in average spectral quality.

Applicants further determined a need for extension of the CFA technology to more than four bands to enable compact multi-spectral systems with performance approaching that of hyperspectral systems.

Applicants further determined a need for an arrangement of spectral bands that optimizes inter-band correlation for minimum demosaicing error and maximum spectral quality.

An embodiment of the invention includes a camera system. The camera system includes a mosaic optical color filter array, which includes at least five spectral bands. The camera system, 10, further includes a standard short-wave infrared detector optically coupled to the mosaic optical color filter array.

Another embodiment includes a camera system. The camera system includes a mosaic optical color filter array, which includes a plurality of repeating unit cells that enforce spectral consistency and spatial uniformity. Each repeating unit cell of the plurality of repeating unit cells satisfies a minimum focal-plane array perimeter criterion and a minimum perimeter to area ratio criterion. The minimum perimeter-to-area criterion is satisfied after the minimum focal-plane perimeter criterion. The camera system further includes a short-wave infrared detector optically coupled to the mosaic optical color filter array.

Another embodiment of the invention includes a camera system. The camera system includes a mosaic optical color filter array, which includes a plurality of repeating unit cells that enforce spectral consistency and spatial uniformity. Each repeating unit cell of the plurality of repeating unit cells minimizes inter-band correlation between nearest neighbors within the unit cell and therefore maximizes inter-band correlation between non-nearest neighbors.

Another embodiment of the invention includes a camera system. The camera system includes a mosaic optical color filter array, which includes a plurality of repeating unit cells that enforce spectral consistency and spatial uniformity. Each repeating unit cell of the plurality of repeating unit cells satisfies a minimum focal-plane array perimeter criterion and a minimum perimeter to area ratio criterion. The minimum perimeter-to-area criterion is satisfied after said minimum focal-plane perimeter criterion. The mosaic optical color filter array includes at least six spectral bands. The plurality of repeating unit cells includes at least six spectral bands. The camera system further includes a standard visible-wavelength detector optically coupled to the mosaic optical color filter array.

Another embodiment includes a camera system. The camera system includes a mosaic optical color filter array including a plurality of repeating unit cells that enforce spectral consistency and spatial uniformity. Each repeating unit cell of the plurality of repeating unit cells satisfies a minimum nearest-neighbor inter-band correlation criterion. The mosaic optical color filter array includes at least six spectral bands. The plurality of repeating unit cells includes the at least six spectral bands. The camera system further includes a detector optically coupled to the mosaic optical color filter array. The detector includes a visible wavelength detector or a short wave infrared detector.

Optionally, the shortwave infrared detector is sensitive to light with wavelengths between 1100 and 1700 nm.

Optionally, the minimum nearest neighbor hater-band correlation criterion includes ensuring that next-nearest neighbors are more closely correlated than nearest neighbors within the each repeating unit cell.

An embodiment of the invention has one or more of the following benefits:

(i) an extension of video-rate multi-band spectral imaging to the short-wave infrared;
(ii) the provisional of sufficient spectral resolution for detection and identification of some targets in some backgrounds;
(iii) the non-necessity of additional optical elements or increase system demands for size, weight and power;
(iv) the suitability for use in remote sensing, or imaging through as significant amount of atmosphere;
(v) the provision of the maximum amount of inter-band correlation to be used in demosaicing, thereby minimizing the demosaicing error; and
(vi) the provision of the minimum spatial extent required for high quality imaging spectral measurement.

DETAILED DESCRIPTION OF THE INVENTION

Figure 1:
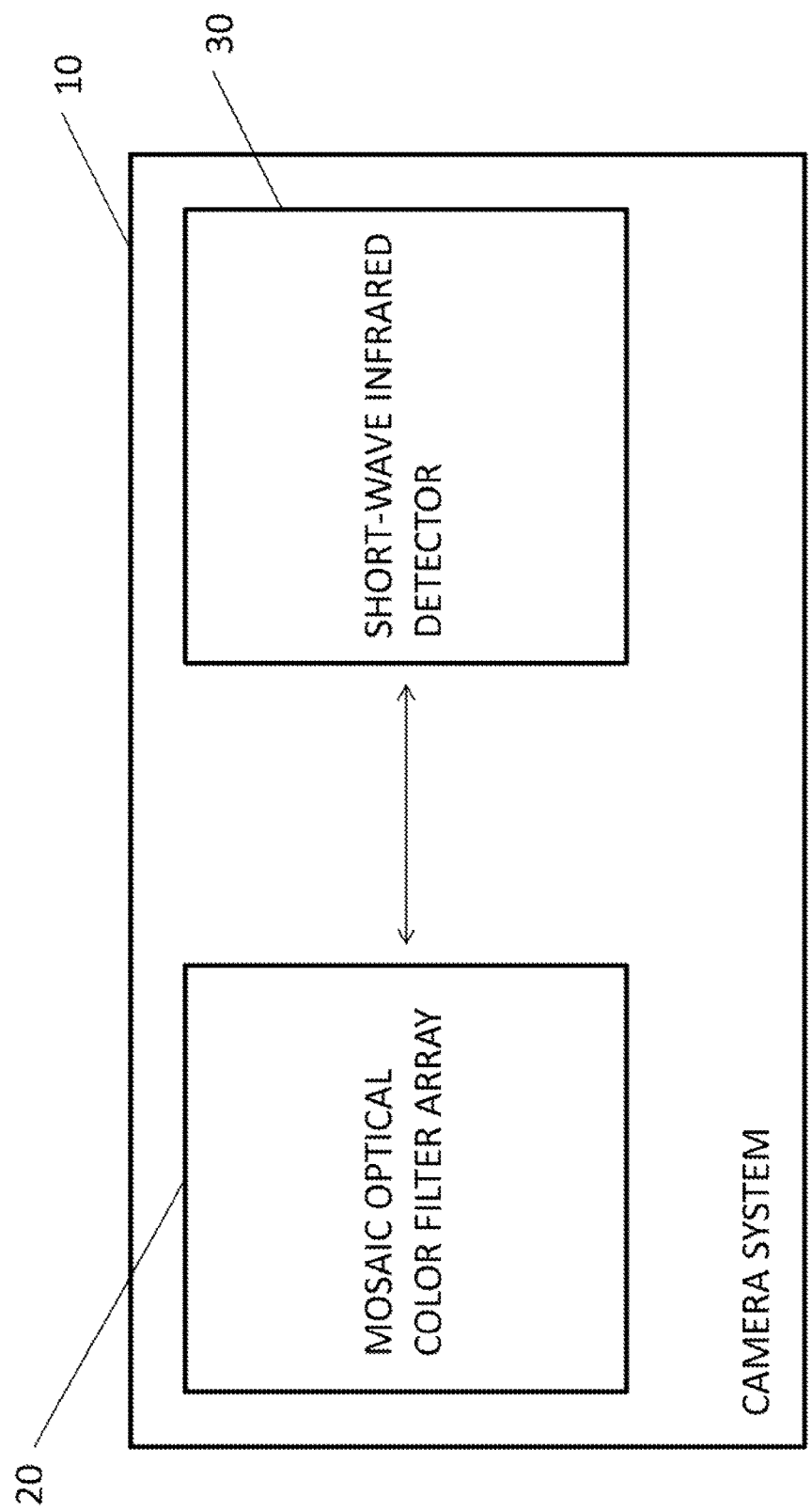
FIG. 1 is a block diagram of at least one embodiment of the instant invention.
Figure 2:
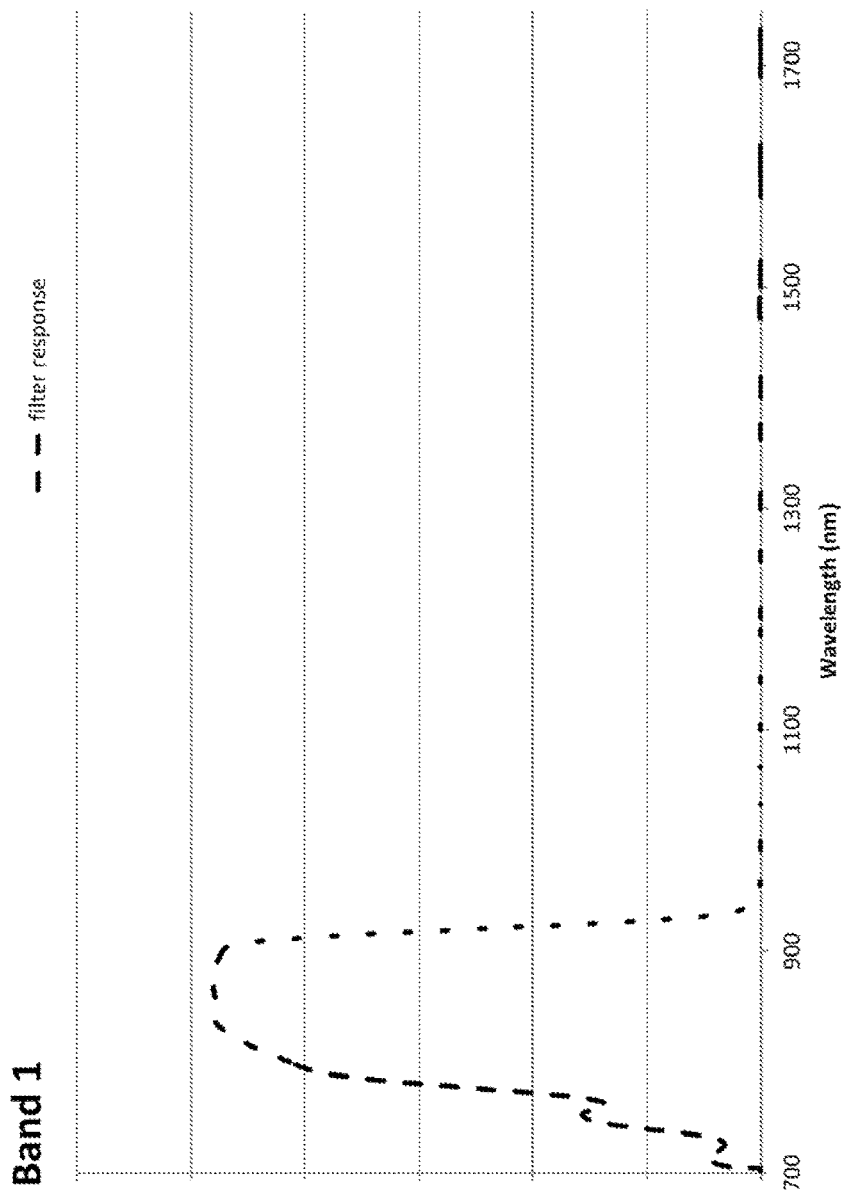
FIG. 2 is an illustrative filter response for Band 1 of an illustrative 9-band embodiment of the instant invention.
Figure 3:
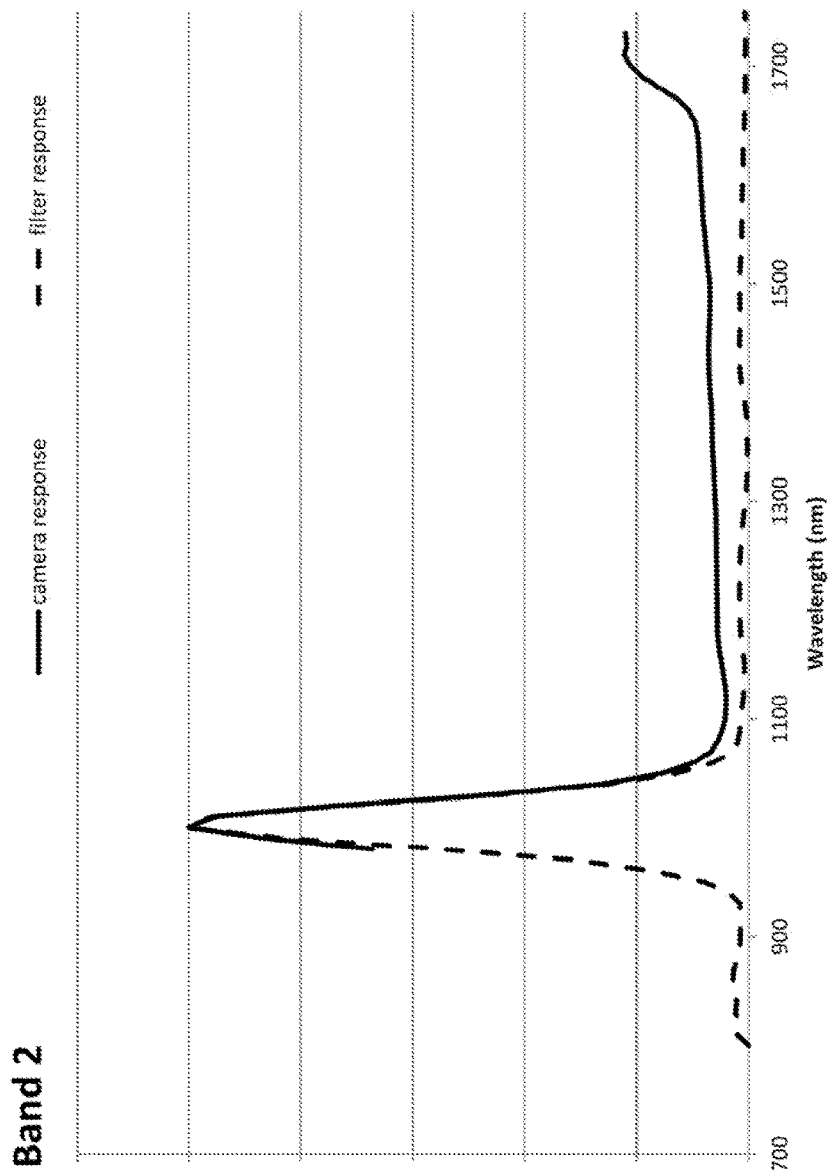
FIG. 3 is an illustrative filter response for Band 2 of an illustrative 9-band embodiment of the instant invention.
Figure 4:
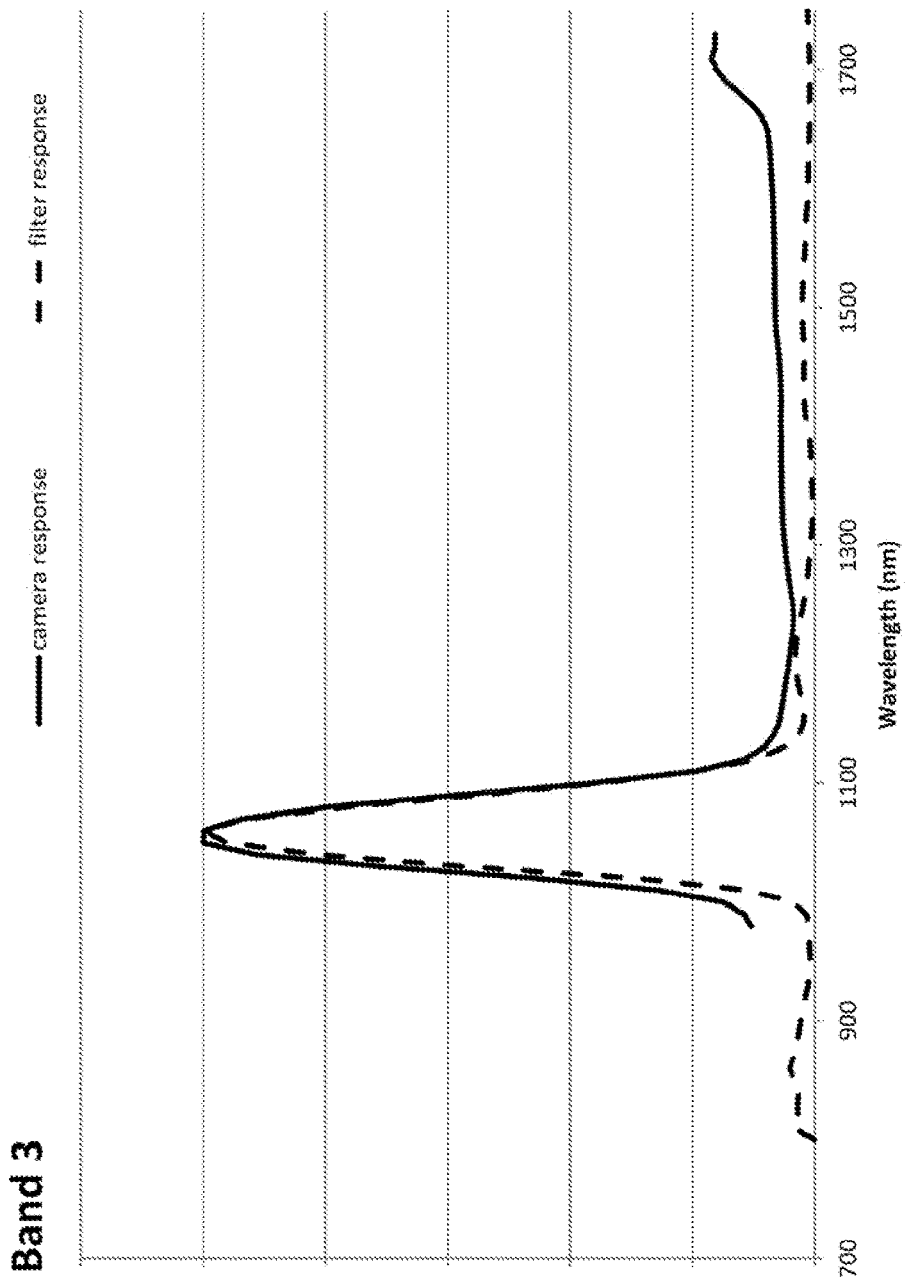
FIG. 4 is an illustrative filter response for Band 3 of an illustrative 9-band embodiment of the instant invention.
Figure 5:
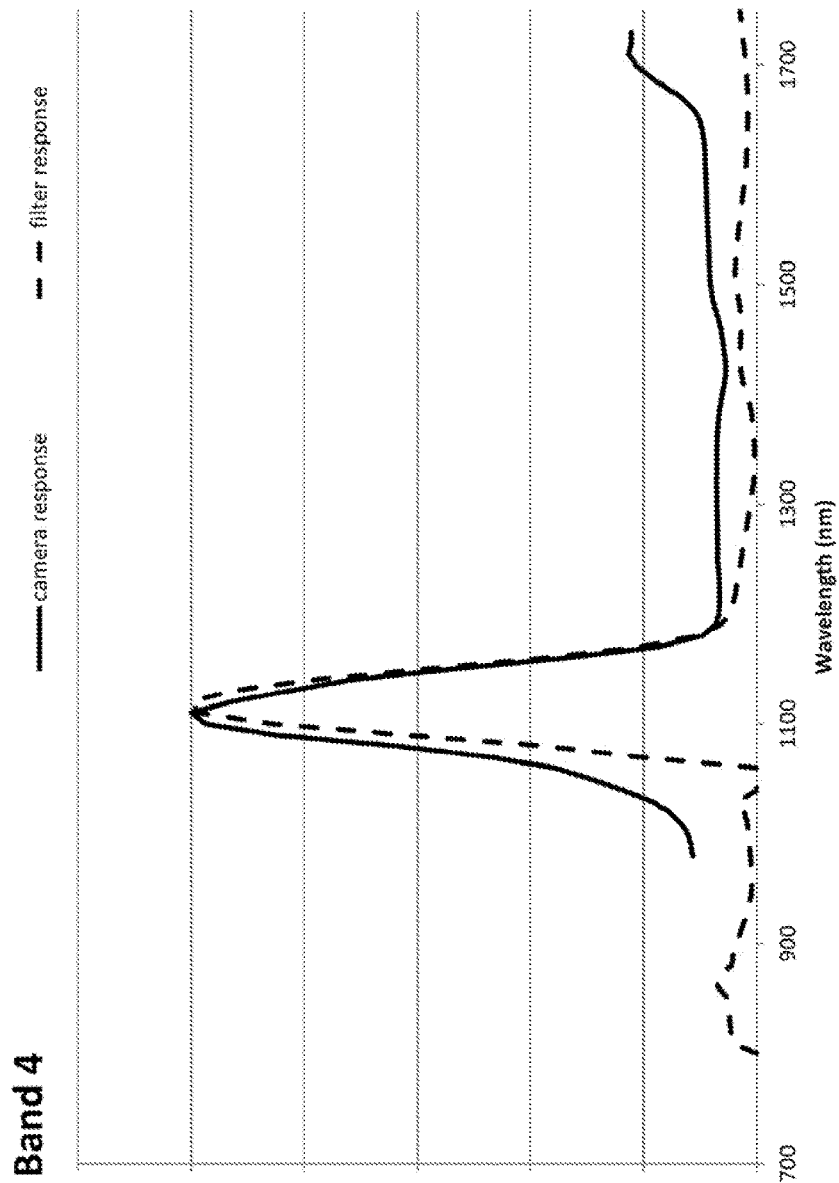
FIG. 5 is an illustrative filter response for Band 4 of an illustrative 9-band embodiment of the instant invention.
Figure 6:
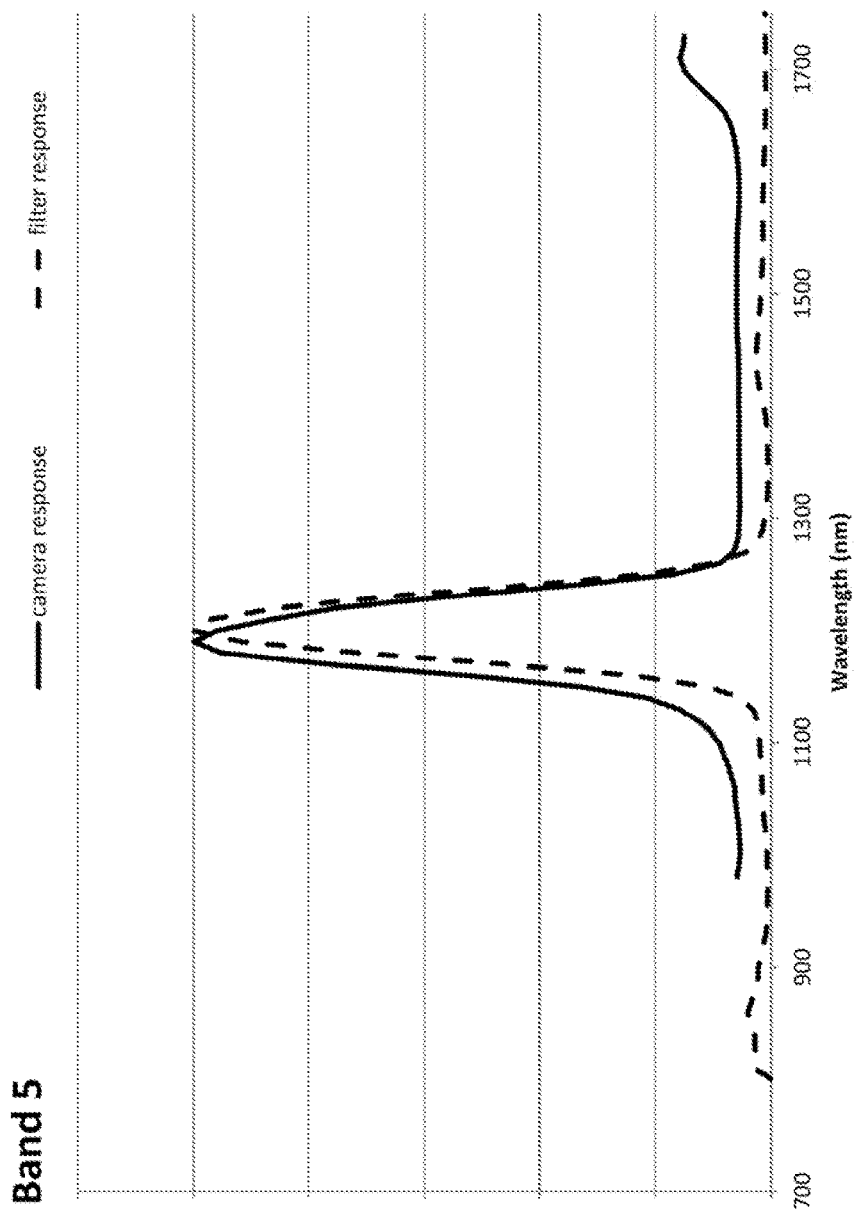
FIG. 6 is an illustrative filter response for Band 5 of an illustrative 9-band embodiment of the instant invention.
Figure 7:
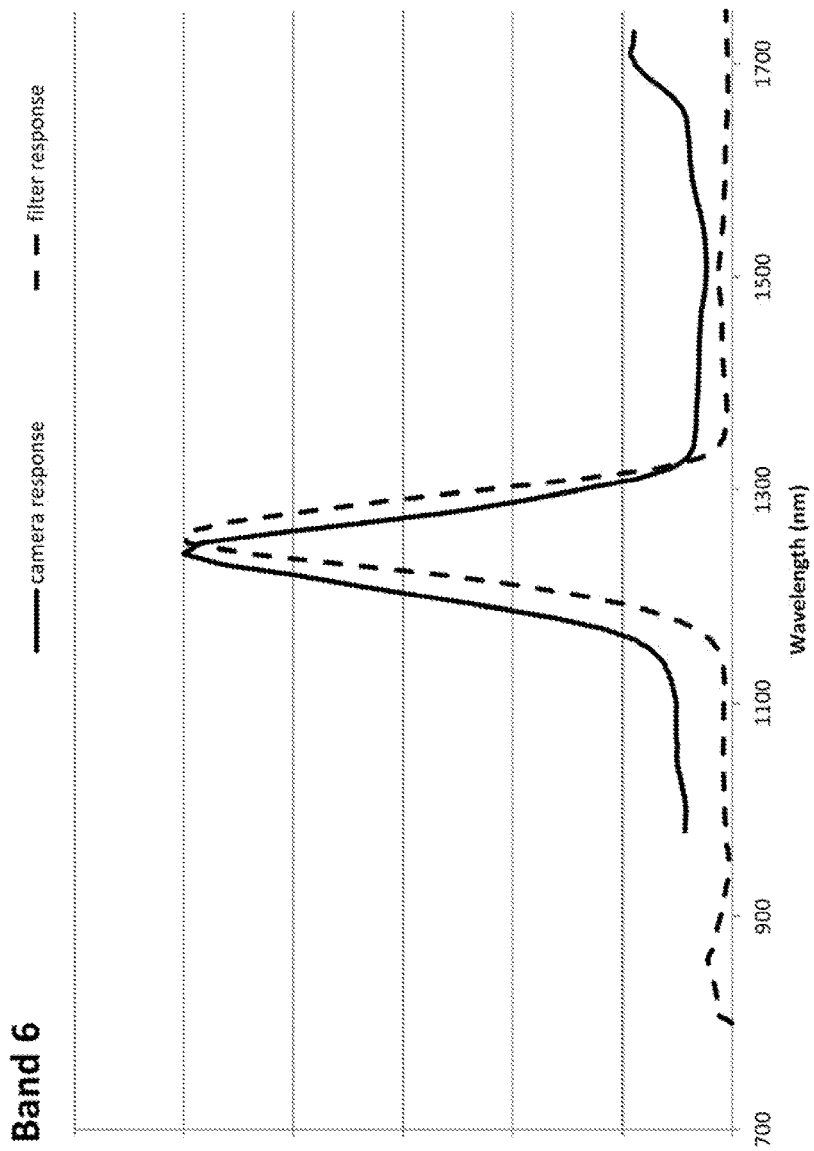
FIG. 7 is an illustrative filter response for Band 6 of an illustrative 9-band embodiment of the instant invention.
Figure 8:
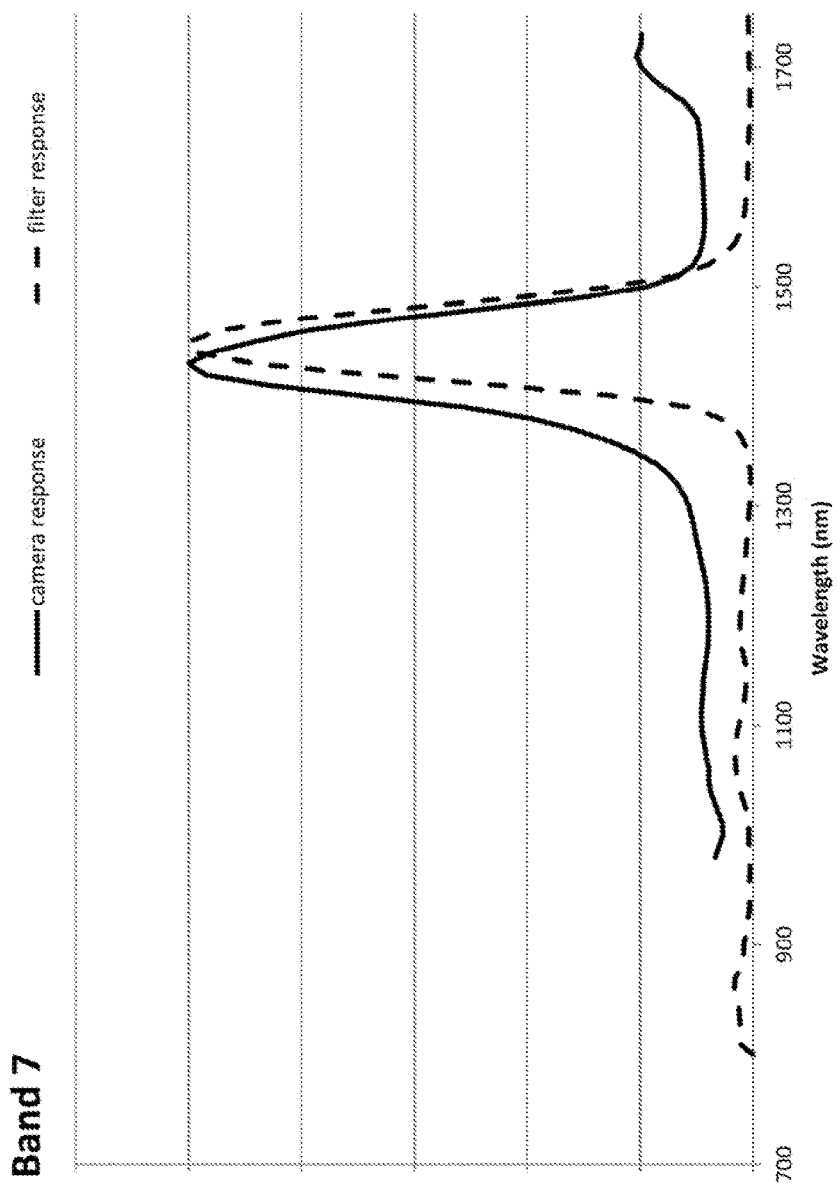
FIG. 8 is an illustrative filter response for Band 7 of an illustrative 9-band embodiment of the instant invention.
Figure 9:
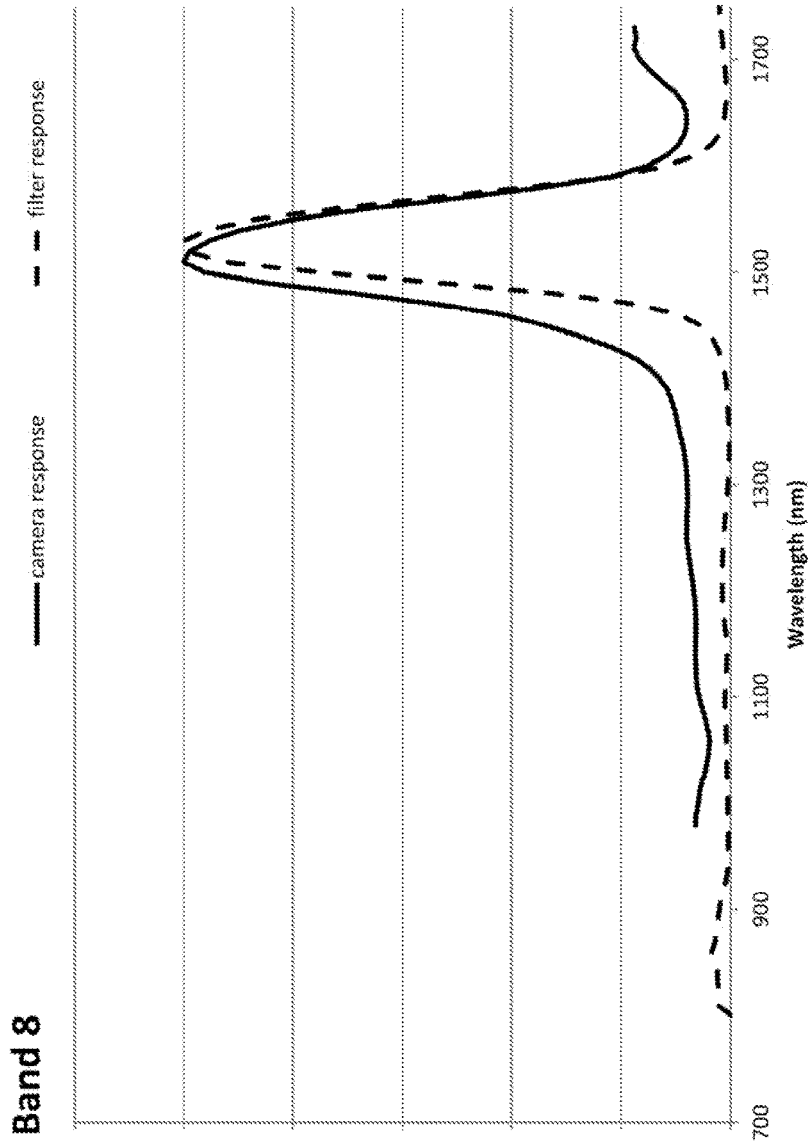
FIG. 9 is an illustrative filter response for Band 8 of an illustrative 9-band embodiment of the instant invention.

Applicants recognized and incorporated the standard design principles of 1) spectral consistency, 2) spatial uniformity, 3) minimum focal-plane perimeter, 4) minimum focal-plane perimeter-to-area ratio, and 5) minimum demosaicing error. Applicants recognized that the first two principles require a color filter array constructed using a repeating unit cell. The third and fourth principles relate to a minimization of the focal-plane detector bi-directional spatial extent and are required for high quality spectral reconstruction. Applicants determined that satisfaction of these third and fourth principles requires that the repeating unit cell have the minimum number of pixels possible to represent the smallest desired target in two dimensions with spectral accuracy. Applicants determined that, in general, for an N-band CFA, applying the minimum focal-plane perimeter and minimum focal-plane perimeter-to-area principles requires using M×P unit cell, where M is the smallest integer greater than or equal to $\sqrt{N}$ and P is the smallest integer equal to or greater than N/M.

Applicants determined that the fifth principle, minimum demosaicing error, constrains the spatial arrangement of the filter elements within the unit cell. Applicants recognized that a CFA spatially sub-samples a scene with spectral bands which may be correlated. Applicants further recognized that correlation between the bands may be exploited to minimize demosaicing error in a standard manner for imaging objects whose image features are comparable to the unit cell size. Without a priori information about the spectral content of imaged scenes, one cannot assume color correlation across a broad spectrum. However, spectral features of solid or liquid objects in the visible and SWIR bands, for example, are often broad, but not necessarily globally correlated. Applicants therefore determined that a fair assumption is that spectral features are locally correlated in terms of their adjacency to neighboring spectral bands. That is, Applicants assume that the closer two spectral bands are in wavelength the more they will feature correlated image content. In turn, Applicants applied the principle of minimum nearest-neighbor correlation by spreading correlated spectral bands to have maximum separation within the repeating unit cell. This imposes the requirement on a CFA design according the instant invention that each pixel should have first nearest neighbors that are as far apart as possible spectrally from the spectral band of the given pixel. That is, minimization of demosaicing error requires maximizing spectral distance between nearest neighbors. For example, in an illustrative 9-band CFA according to an embodiment of the instant invention, for minimization of demosaicing error when using more than single-band information, Applicants determined that a color filter array preferably allows for any spatial-spectral correlation to be exploited. This spatial-spectral correlation is, for example, further effected by minimizing the spectral distance between next-nearest neighbors spatially diagonal pixels in this 9-band CFA design). By applying the above principles, Applicants optimized the mosaic pattern by exploiting local spectral correlation.

The mosaic pattern can be optimized by spreading out spectral neighbors to the greatest extent possible and ensuring minimum spectral distance between next-nearest neighbors, while still preserving the smallest possible close-packed mosaic unit cell. In this fashion, the broad distribution of spectral neighbors (having naturally correlated spectral content) will help preserve overall image structure and thus lead to generation of an effective spectral unit cell having a physical size less than or equal to the size of the mosaic unit cell. This operation is a accomplished by suitable spatial arrangement of the spectral bands regardless of the number of bands.

An embodiment of the invention is described by way of illustration with reference to FIG. 1. This embodiment of the invention includes a camera system 10. The camera system 10 includes a standard mosaic optical color filter array 20, which includes at least five spectral bands. The camera system 10 further includes a standard short-wave infrared detector 30 optically coupled to the mosaic optical color filter array 20. At least one example of an acceptable mosaic color filter array for use in an embodiment of the instant invention is discussed in U.S. Pat. No. 6,638,668 to Buchsbaum, which is incorporated herein by reference.

Optionally, the mosaic optical color filter array is fabricated separately from the detector 30. In addition, the manufacturing process of the multispectral imaging apparatus or camera system 10 disclosed herein is applicable to CFAs co-fabricated with the detector.

Optionally, the mosaic optical color filter array 20 includes a plurality of repeating unit cells including the at least five spectral bands. One of ordinary skill in the art will appreciate that the number of spectral bands, their widths, and their band center wavelengths is application-dependent, i.e., what targets are desired to be observed. The plurality of repeating unit cells enforce spectral consistency and spatial uniformity. Each repeating unit cell of the plurality of repeating unit cells satisfies minimum focal-plane perimeter criterion and a minimum perimeter-to-area ratio criterion. In practice, a user will apply the minimum focal-plane perimeter criterion to identify possible CFA sizes and then, if needed, apply the minimum focal-plane perimeter-to-area ratio criterion to cull out a preferred CFA size from the possible CFA sizes. For example, applying the minimum focal-plane perimeter criterion to an 8-band color filter array yields two possible CFA sizes: a 3×3 CFA size and a 4×2 CFA size, A 4×2 cell is the smallest integer-length rectangle or square with eight bands and thus has a minimum perimeter. A 3×3 cell also is an integer-length rectangle or square with eight bands and also has a minimum perimeter. The minimum perimeter-to-area ratio criterion is then applied to these two possible CFA sizes to determine the preferred CFA size, i.e., to determine which CFA size offers more equal spatial frequencies for the two image directions. The perimeter-to-area criterion then, for example, yields a 3×3 CFA size, but not a 4×2 CFA size, because the 3×3 CFA size has a smaller perimeter-to-area ratio than the 4×2 CFA size. Optionally, each spectral band of the at least five spectral bands includes a plurality of spatial nearest neighbors and a plurality of spatial next-nearest neighbors. The each spectral band of the at least five spectral bands is located on the mosaic optical color filter array such that the each spectral band has a greater correlation with the plurality of spatial next-nearest neighbors than with the plurality of spatial nearest neighbors. Optionally, the each spectral band of the at least five spectral bands is located on the mosaic optical color filter array such that the plurality of spatial nearest neighbors are spectrally nonadjacent. For example, for an illustrative 9-hand 3×3 CFA, each diagonal or anti-diagonal line in the CFA is occupied by spectrally nearest neighbors.

Optionally, the at least five spectral bands include N spectral bands. The each repeating unit cell of the plurality of repeating unit cells includes an M×P unit cell where M is a smallest integer equal to or greater than a square root of N and where P is a smallest integer equal to or greater than N/M.

Changing the number of bands leads to new mosaic patterns that retain the symmetries and algorithmic constraints in the above-described system and operations of multispectral image collection. Illustrative CFA sizes the follow the above-mentioned principles are listed in Table 1.

TABLE 1

| Number of bands | CFA size | Number of repeated bands |
| --- | --- | --- |
| 5 | 3 × 2 | 1 |
| 6 | 3 × 2 | 0 |
| 7 | 3 × 3 | 2 |
| 8 | 3 × 3 | 1 |
| 9 | 3 × 3 | 0 |
| 10 | 4 × 3 | 2 |
| 11 | 4 × 3 | 1 |
| 12 | 4 × 3 | 0 |
| 13 | 4 × 4 | 3 |
| 14 | 4 × 4 | 2 |
| 15 | 4 × 4 | 1 |
| 16 | 4 × 4 | 0 |
| 17 | 5 × 4 | 3 |
| 18 | 5 × 4 | 2 |
| 19 | 5 × 4 | 1 |
| 20 | 5 × 4 | 0 |
| 21 | 5 × 5 | 4 |
| 22 | 5 × 5 | 3 |

TABLE 1-continued

| Number of bands | CFA size | Number of repeated bands |
|---|---|---|
| 23 | 5 × 5 | 2 |
| 24 | 5 × 5 | 1 |
| 25 | 5 × 5 | 0 |
| 26 | 6 × 5 | 4 |
| 27 | 6 × 5 | 3 |
| 28 | 6 × 5 | 2 |
| 29 | 6 × 5 | 1 |
| 30 | 6 × 5 | 0 |

For example, applying Table 1 to a color filter array with 9 SWIR bands would yield a 3×3 unit cell. As another example, applying Table 1 to a color filter array with 11 SWIR bands would yield a 4×3 unit cell.

Another example is provided as follows to illustrate how to take advantage of local spectral correlation according to an embodiment of the invention. Minimization of the spectral distance for second-nearest-neighbor (e.g., diagonally adjacent and anti-diagonally adjacent) pixels in the 9-band case is equivalent to a maximization of the spectral distance for first nearest neighbor pixels. This ensures maximum correlation among the next-nearest neighbors surrounding each pixel while minimizing correlation between each pixel and its nearest neighbors. Given nine spectral bands, one example of a pattern developed according to an embodiment of the instant invention is shown in Table 2.

TABLE 2

| 4 | 1 | 8 |
|---|---|---|
| 7 | 5 | 3 |
| 2 | 9 | 6 |

Referring to Table 2, the index of each band designates its order in the spectral domain. Continuing with this nine spectral band CFA example, FIGS. 2-10 show illustrative filter responses for Band 1-9 pixels, respectively. The bands are arranged in the unit cell to minimize adjacent spectral bands being placed as nearest neighbors spatially. For example, Band 3 is bordered on the low-wavelength side by Band 2 and on the high-wavelength side by Band 4. If it is remembered that the unit cell is to be repeated across the CFA, it can be noted that elements along a diagonal line are members of spectrally local groups. For example, Band 2 is only found on the same diagonal line as Band 1 & Band 3. For spectral bands that are equally spaced, permutations of this arrangement where elements are exchanged with any other element along the diagonal all have the same average spectral distance for diagonally adjacent pixels. One of ordinary skill in the art will recognize that cyclic permutations, reflections and rotations of the above pattern are all equivalent. Further, one of ordinary skill in the art will recognize that the exchange of some adjacent spectral bands, for example, the exchange of band 8 and band 9, would not affect the demosaicing error, as it would not affect the average inter-band correlation between next-nearest or nearest neighbors.

Given eight spectral bands, an example of a pattern developed according to an embodiment of the instant invention is shown in Table 3.

TABLE 3

| 5 | 1 | 7 |
|---|---|---|
| 8 | 4 | 2 |
| 3 | 6 | 5 |

Referring to Table 3, the index of each band designates its order in the spectral domain. The bands are arranged in the unit cell to minimize adjacent spectral bands being placed as nearest neighbors spatially. One of ordinary skill in the art will recognize that cyclic permutations, reflections and rotations of the above pattern are all equivalent.

Given eight spectral bands, another example of a pattern for a 4×2 unit cell developed according to another embodiment of the instant invention is shown in Table 4. Inter-band correlation is the measure of similarity of image content between any two spectral bands. The 4×2 unit cell is not consistent with the principle of minimum perimeter-to-area ratio, but can still conform to the principle of minimum demosaicing error by minimizing inter-band correlation between nearest neighbors within the unit cell. This minimization is done by arranging the bands spatially so that the next-nearest neighbors are more correlated than nearest neighbors.

TABLE 4

| 1 | 5 | 3 | 6 |
|---|---|---|---|
| 8 | 2 | 7 | 4 |

Referring to Table 4, the index of each band designates its order in the spectral domain. As can be seen in Table 4, bands are arranged in the unit cell to minimize adjacent spectral bands being placed as nearest neighbors spatially. One of ordinary skill in the art will recognize that cyclic permutations, reflections and rotations of the above pattern are all equivalent.

In an illustrative embodiment of the invention, the CFA's spectral bands aligned to the sensitivity of an InGaAs detector material. Band centers and widths are further chosen to evenly sample the wavelength space available for imaging through a large amount of atmosphere. Because typical atmospheric absorption cuts out some spectral information, a CFA according to an embodiment of the instant invention is preferably blind to spectral information screened by the atmosphere. Band widths preferably fully cover the available bandwidth with minimal overlap between adjacent bands. Band center wavelengths ("CWLs") for an illustrative CFA are specified in table 5 below:

TABLE 5

| Band # | 1 | 2 | 3 | 4 | 5 | 6 | 7 | 8 | 9 |
|---|---|---|---|---|---|---|---|---|---|
| CWL (nm) | 920 | 1010 | 1075 | 1190 | 1240 | 1290 | 1550 | 1620 | 1690 |

Spectral bands are chosen to evenly sample windows of high atmospheric transmission for long-range imaging. One of ordinary skill in the art will appreciate that alternative choices of band centers other than those listed in Table 5 depend on other applications. Also, for example, special bands are chosen to match up with the sensitivity curve consistent with an InGaAs sensor, different band centers match other SWIR detector materials (e.g. HgCdTe and InSb) or in cases where some spectral regions have smaller or larger band separations.

Optionally, the each repeating unit cell of the plurality of repeating unit cells includes at least one pixel for each spectral band of the at least five spectral bands.

Optionally, the mosaic optical color filter array 20 is affixed to the short-wave infrared detector or is located at a distance from the short-wave infrared detector. For example, the mosaic optical color filter array is adhered to a focal-plane array. Other designs include reimaging the filter array onto a detector array or fabrication of the filter array directly on the detector array.

In an illustrative embodiment of the invention, the CFA fits onto a standard InGaAs sensor with a two dimensional format of 640×512 square pixels and a 25 micron sensor pitch. The filter consists of a 3×3 repeating pattern of pixel-sized filters on a 0.5 mm thick transmissive substrate. The filter is designed to be placed in close proximity (~2 microns) to a focal-plane array sensor.

Optionally, the short-wave infrared detector 30 includes a standard focal-plane array or a standard linear detector array.

Optionally, the at least five spectral bands are unaffected by atmospheric absorption. That is, according to this optional embodiment of the invention, the CFA only accepts light that can be transmitted through the atmosphere.

Optionally, the short-wave infrared detector 30 is sensitive to light with wavelengths between 1100 and 1700 nm.

Another embodiment of the invention is described by way of illustration with reference to FIG. 1. This embodiment includes a camera system 10. The camera system 10 includes a mosaic optical color filter array 20, which includes as plurality of repeating unit cells that enforce spectral consistency and spatial uniformity. Each repeating unit cell of the plurality of repeating unit cells satisfies a minimum focal-plane perimeter criterion and a minimum perimeter-to-area ratio criterion. The camera system 10 further includes a short-wave infrared detector 30 optically coupled to the mosaic optical color filter array.

Optionally, the mosaic optical color filter array 20 includes at least five spectral bands. The plurality of repeating unit cells includes the at least five spectral bands. Each spectral band of the at least five spectral bands includes a plurality of spatial nearest neighbors and a plurality of spatial next-nearest neighbors. The each spectral band of the at least five spectral bands is located on the mosaic optical color filter array such that said each spectral band has a greater correlation with said plurality of spatial next-nearest neighbors than with said plurality of spatial nearest neighbors.

Optionally, the each spectral band of the at least five spectral bands is located on the mosaic optical color filter array such that the plurality of spatial nearest neighbors are spectrally nonadjacent.

Optionally, the at least five spectral bands comprise N spectral bands, said each repeating unit cell of said plurality of repeating unit cells comprising an M×P unit cell where M is a smallest integer at least equal to a square root of N and where P is a smallest integer at least equal to N/M.

Optionally, the each repeating unit cell of the plurality of repeating unit cells includes at least one pixel for each spectral band of the at least five spectral bands.

Optionally, the mosaic optical color filter array 20 is affixed to the short-wave infrared detector 30 or is located at a distance from the short-wave infrared detector 30.

Optionally, the short-wave infrared detector 30 includes a standard focal-plane array or a standard linear detector array.

Optionally, the at least five spectral bands is unaffected by atmospheric absorption.

Optionally, the short-wave infrared detector is sensitive to light with wavelengths between 1100 and 1700 nm.

Figure 10:
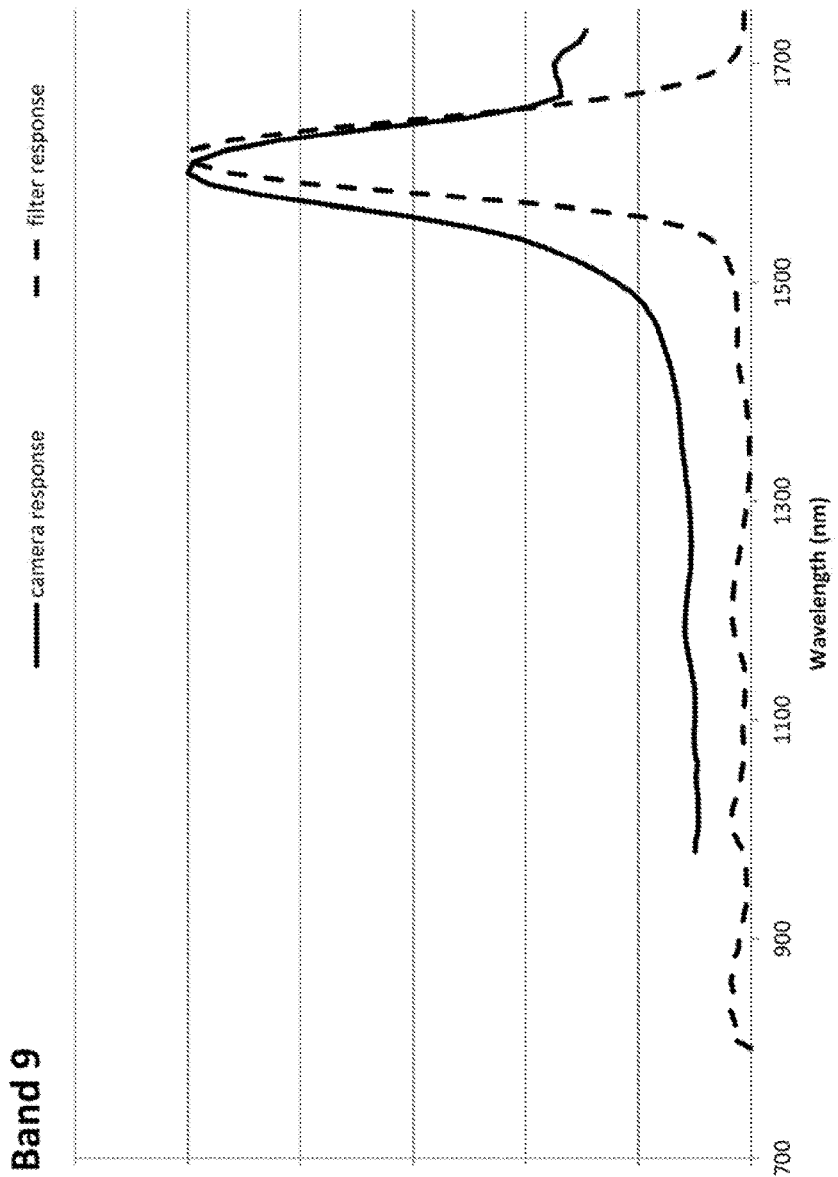
FIG. 10 is an illustrative filter response for Band 9 of an illustrative 9-band embodiment of the instant invention.
Figure 11:
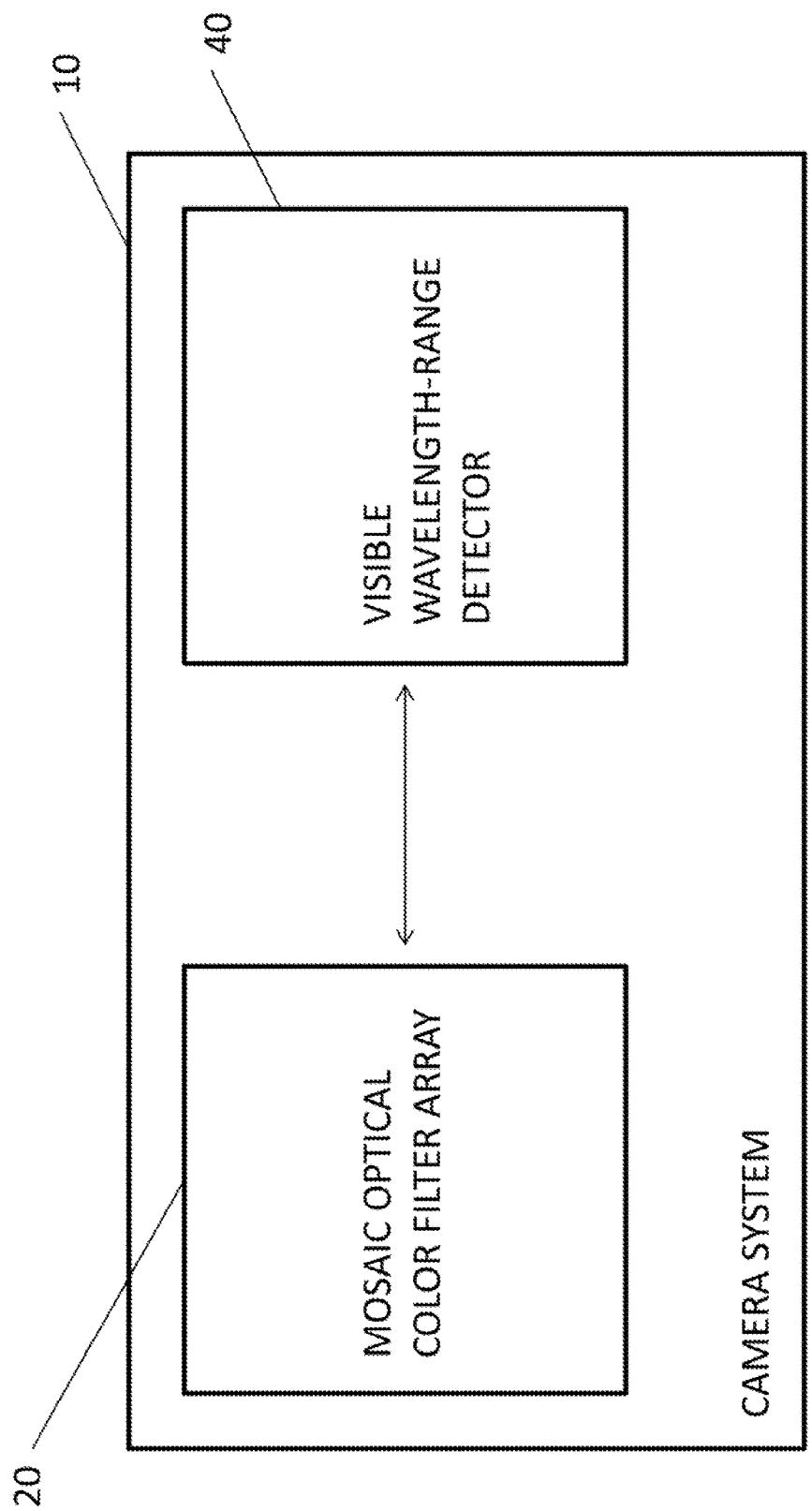
FIG. 11 is a block diagram of at least one embodiment of the instant invention.

Another embodiment of the invention is described as follows by way of illustration with reference to FIG. 10. This embodiment includes a camera system 10. The camera system 10 includes a mosaic optical color filter array 20, which includes a plurality of repeating unit cells that enforce spectral consistency and spatial uniformity. Each repeating unit cell of the plurality of repeating unit cells satisfies a minimum focal-plane perimeter criterion and a minimum perimeter-to-area ratio criterion. The mosaic optical color filter array includes at least six spectral bands. The plurality of repeating unit cells includes at least six spectral bands. The camera system 10 further includes a standard visible-wavelength detector 40 optically coupled to the mosaic optical color filter array 20.

Optionally, each spectral band of the at least six spectral bands comprises a plurality of spatial nearest neighbors and a plurality of spatial next-nearest neighbors, said each spectral band of the at least five spectral bands being located on the mosaic optical color filter array such that said each spectral band has a greater correlation with said plurality of spatial next-nearest neighbors than with said plurality of spatial nearest neighbors.

Another embodiment includes a camera system and is described as follows with reference by way of illustration to FIGS. 1 and 10. The camera system 10 includes a mosaic optical color filter array 20 including as plurality of repeating unit cells that enforce spectral consistency and spatial uniformity. Overall inter-band correlation is fixed by the selection of spectral bands. The nearest-neighbor inter-band correlation and next-nearest neighbor inter-band correlation depend on the placement of spectral bands within each repeating unit cell. The nearest neighbor inter-band correlation is minimized to exploit the stronger next-nearest neighbor inter-band correlation in the demosaicing process. Accordingly, each repeating unit cell of the plurality of repeating unit cells satisfies a minimum nearest-neighbor inter-band correlation criterion. The mosaic optical color filter array 20 includes at least six spectral bands. The plurality of repeating unit cells includes the at least six spectral bands. The camera system further includes a detector optically coupled to the mosaic optical color filter array 20. The detector includes a visible wavelength detector 40 or a short wave infrared detector 30.

Optionally, the short-wave infrared detector 30 is sensitive to light with wavelengths between 1100 and 1700 nm.

Optionally, the minimum nearest neighbor inter-band correlation criterion includes ensuring that next-nearest neighbors are more closely correlated than nearest neighbors within the each repeating unit cell.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has" "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed is:

1. A device comprising:
a mosaic optical color filter array comprising a plurality of repeating unit cells that enforce spectral consistency and spatial uniformity, each repeating unit cell of the plurality of repeating unit cells satisfying a minimum focal-plane perimeter criterion and a minimum perimeter-to-area criterion, said minimum perimeter-to-area criterion being satisfied after said minimum focal-plane perimeter criterion; and
a short-wave infrared detector optically coupled to said mosaic optical color filter array,
wherein said mosaic optical color filter array comprises at least five spectral bands, said plurality of repeating unit cells comprising said at least five spectral bands,
wherein each spectral band of the at least five spectral bands comprises a plurality of spatial nearest neighbor and a plurality of spatial next-nearest neighbors, said each spectral band of the at least five spectral bands being located on the mosaic optical color filter array such that said each spectral band has a greater correlation with said plurality of spatial next-nearest neighbors than with said plurality of spatial nearest neighbors.

2. The device according to claim 1, wherein said each spectral band of the at least five spectral bands is located on the mosaic optical color filter array such that the plurality of spatial nearest neighbors are spectrally nonadjacent.

3. The device according to claim 1, wherein said at least five spectral bands comprise N spectral bands, said each repeating unit cell of said plurality of repeating unit cells comprising an M×P unit cell where M is a smallest integer at least equal to a square root of N and where P is a smallest integer at least equal to N/M.

4. The device according to claim 1, wherein said each repeating unit cell of said plurality of repeating unit cells comprises at least one pixel for each spectral band of said at least five spectral bands.

5. The device according to claim 1, wherein said mosaic optical color filter array is one of affixed to said short-wave infrared detector and located at a distance from said short-wave infrared detector.

6. The device according to claim 1, wherein said short-wave infrared detector comprises one of a focal-plane array and a linear detector array.

7. The device according to claim 1, wherein said at least five spectral bands are free from an effect of atmospheric absorption.

8. The device according to claim 1, wherein said short-wave infrared detector is sensitive to light with wavelengths between 1100 and 1700 nm.

9. A device comprising:
a mosaic optical color filter array comprising a plurality of repeating unit cells that enforce spectral consistency and spatial uniformity, each repeating unit cell of the plurality of repeating unit cells satisfying a minimum focal-plane perimeter criterion and a minimum perimeter-to-area criterion, said minimum focal-plane perimeter criterion being satisfied after said minimum focal-plane perimeter criterion, said mosaic optical color filter array comprises at least six spectral bands, said plurality of repeating unit cells comprising said at least six spectral bands; and
a visible wavelength detector optically coupled to said mosaic optical color filter array,
wherein each spectral band of the at least six spectral bands comprises a plurality of spatial nearest neighbors and a plurality of spatial next-nearest neighbors, said each spectral band of the at least six spectral bands being located on the mosaic optical color filter array such that said each spectral band has a greater correlation with said plurality of spatial next-nearest neighbors than with said plurality of spatial nearest neighbors.

10. A device comprising:
a mosaic optical color filter array comprising a plurality of repeating unit cells that enforce spectral consistency and spatial uniformity, each repeating unit cell of the plurality of repeating unit cells satisfying a minimum nearest-neighbor inter-band correlation criterion, said mosaic optical color filter array comprises at least six spectral bands, said at least six spectral bands being spectrally distinct, said plurality of repeating unit cells comprising said at least six spectral bands; and
a visible wavelength detector optically coupled to said mosaic optical color filter array,
wherein each spectral band of the at least six spectral bands comprises a plurality of spatial nearest neighbors and a plurality of spatial next-nearest neighbors, said each spectral band of the at least six spectral bands minimizing adjacent spectral bands of the at least six spectral bands being placed as nearest neighbors spatially.

* * * * *